UNITED STATES PATENT OFFICE.

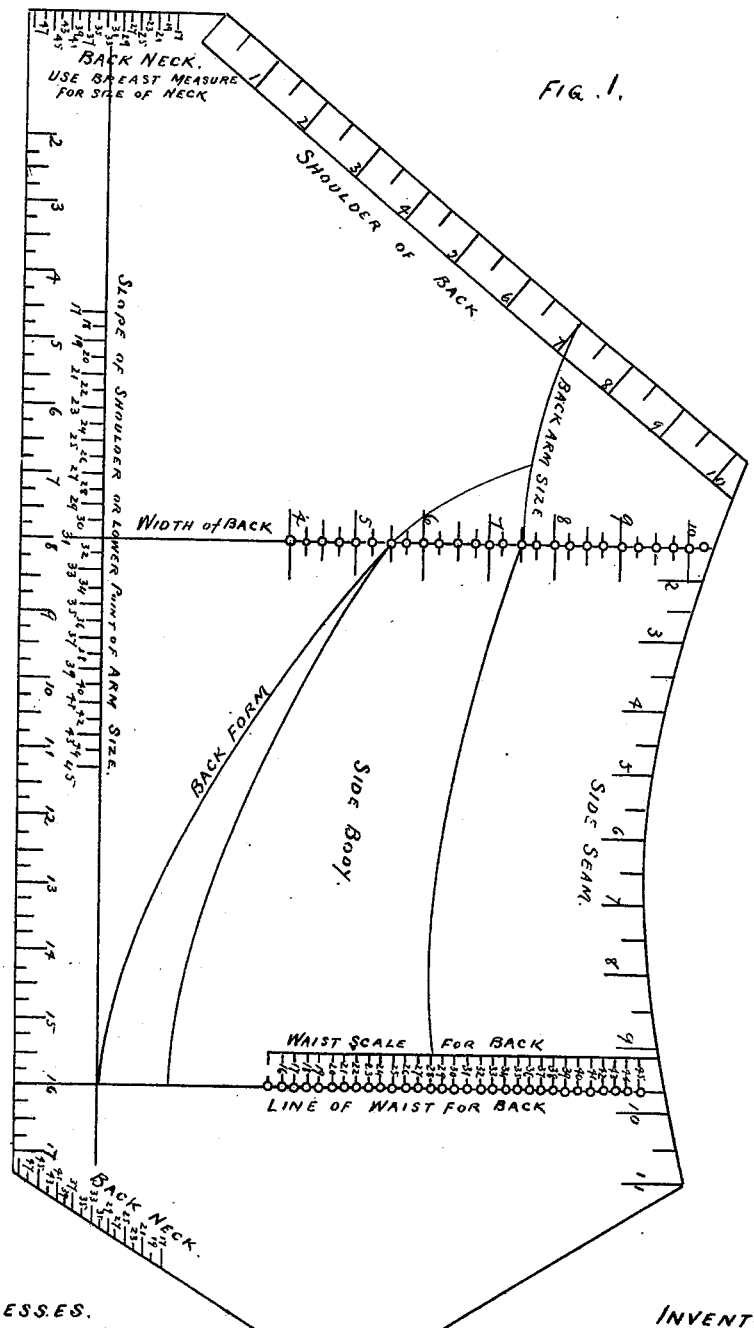

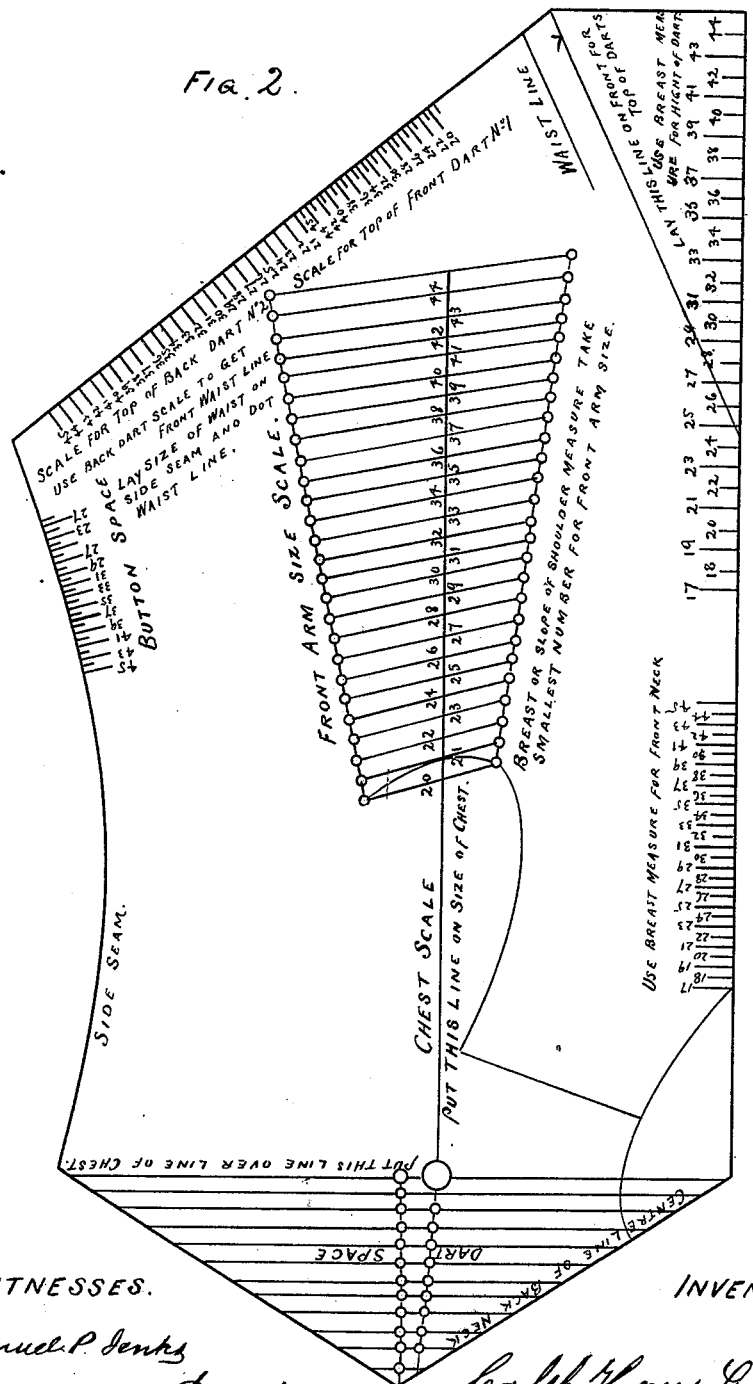

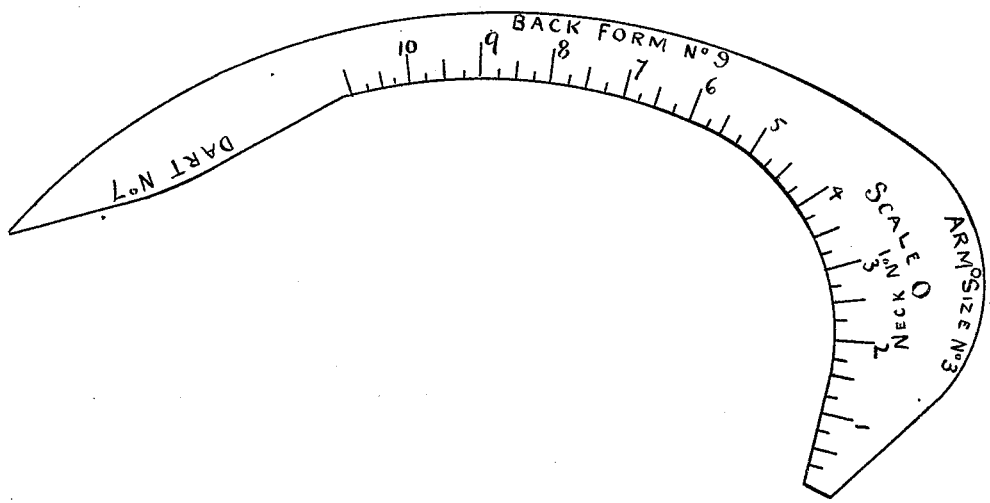

CALEB H. GRIFFIN, OF LYNN, ASSIGNOR OF ONE-HALF HIS RIGHT TO ELIZABETH ELLEN DURGIN, OF MALDEN CENTRE, MASS.

IMPROVEMENT IN DRAFTING APPARATUS FOR LADIES' DRESSES.

Specification forming part of Letters Patent No. 195,926, dated October 9, 1877; application filed April 30, 1877.

*To all whom it may concern:*

Be it known that I, CALEB HENRY GRIFFIN, of the city of Lynn, Essex county, and State of Massachusetts, have invented a new and Improved Combination of Devices called "The American Drafting-Machine in Paper," of which the following is a specification:

The nature of my invention is that of a device in the form of a pattern furnished with scales, perforations, and indicating-characters; and the object is to facilitate the making of a paper pattern for the cutting out of dresses.

Referring to the drawings, Figure 1 shows one side of my device. Fig. 2 shows the other side. Fig. 3 is a representation of the pattern called "Scale O," hereinafter referred to, which is the subject of another application by myself, now before the Patent Office.

In the drawings, Fig. 1 represents a pattern of six sides, one of them curved, provided with scales and indicating-figures on five sides, and with three scales with figures, and two of these with perforations in the body of the same. Four curved lines are also seen, and are hereinafter adverted to.

At the edges of the two shorter sides are seen, respectively, two scales, each marked "Back neck," the lines marking divisions of one-eighth inch each, and numbered, respectively, from 17 to 49, inclusive. It will be seen that the left-hand back-neck scale is at right angles to the base-line in the drawing, while the corresponding right-hand scale is at an obtuse angle to the base-line.

The curves seen in Fig. 1, marked, respectively, "Back-arm size," "Side seam," and "Back-form," and one with no mark, are explained (by the directions for their use) in the clauses of the specification entitled "Operation."

The base-line of Fig. 1 is marked with a scale of inches, and halves and quarters of inches, and the longer lines are numbered from 2 to 17, inclusive. Above the scale, in the drawing, is seen another line parallel with it, marked "Slope of shoulder, or lower point of back-arm size." This line has upon it a scale with lines marking divisions of half an inch, and shorter lines half-way between, both series of lines being marked with figures, from 17 to 45, inclusive.

Running up perpendicularly from the base-line of Fig. 1 is a line marked "Width of back," which bears a scale whose longer lines indicate divisions of one inch, and are marked with the numbers 4 to 10, inclusive. The spaces between these lines are subdivided into spaces of one-quarter of an inch each by three shorter lines, respectively, and each line is furnished with a perforation.

On the longer left-hand side of the device is a scale marked "Shoulder of back," divided by lines one inch apart, which lines are marked 1 to 10, inclusive. Shorter lines, between the numbered lines, divide these spaces into equal parts.

At the right hand in Fig. 1 is seen a line running at right angles to the base-line of the figure, and marked "Line of waist for back," and provided with a scale marked "Waist-scale for back," which is divided by lines numbered from 17 to 45, inclusive, and furnished with a perforation at each line.

The curved side of the device is also provided with a scale marked "Side seam," and divided by lines numbered from 1 to 11, inclusive, with shorter lines equidistantly placed between them. The use of these scales is indicated in the clause of this specification describing the operation of the invention.

In Fig. 2 the base-line is the same as in Fig. 1. In Fig. 2 is seen a number of scales, lines, curves, and perforations, described *seriatim* hereinafter. At the right of the center of the figure is seen a series of twenty-six parallel lines of varying length, their ends, respectively, connected by a line, on each of which lines (twenty-five of which are numbered 20 to 44, inclusive) is a series of perforations, one at each end of each of the lines, the whole forming a diagram marked " Front-arm-size scale," while below, on the lower side of the diagram, are the words "Breast or slope of shoulder; take smallest number for front-arm size."

On the base-line, at the edge of the device, to the left of the center of the same, is a scale whose lines are numbered 17 to 45, inclusive, and the marking attached to this scale is "Use breast-measure for front neck."

On the base-line, also at the edge, is another scale, with the lines marked 17 to 44, inclusive, the marking attached to this scale being "Use breast-measure for height of darts."

At the right of the figure is the shortest of the side lines of the device. From the top of this shortest side a line is seen to be drawn at an acute angle toward the base-line. This line is marked "Lay this line on front for top of dart."

Above the last-named line, and parallel with it, is a short line running from the top of the short side toward the base-line, and marked "Waist-line."

On the longest side, at the right in the figure, on the edge of the device, are two scales, one marked "Scale for top of front dart No. 1." Each alternate (longer) line of this scale is figured from 20 to 44, inclusive. The other scale, on the edge on this side, is marked "Scale for top of back dart No. 2," and is formed of lines marked 21 to 45, inclusive. Beneath the title above mentioned are the directions "Use back dart-scale to get front-waist line," and "Lay size of waist on side seam and dot waist-line."

At the top of Fig. 2, on the edge of the curved side, is a scale marked "Button-space," composed of longer lines, marked 21 to 45, inclusive, with intermediate shorter lines.

Through the center, horizontally, of Fig. 2 a line is drawn, running from the right-hand bound of the diagram marked "Front-arm-size scale" to the extreme left-hand end of the pattern. This is furnished with perforations at each point of its junction with the parallel lines of the dart-space, the first perforation being the largest. This line is marked "Chest-scale," with the direction "Put this line on size of chest."

At the left hand in Fig. 2 the device is fashioned to an obtuse angle, whose sides are connected by twelve parallel lines drawn equidistantly at right angles to the base-line in Fig. 2. A line is seen drawn from the apex of the triangle to the base-line of the same, at the junction of which line with each of the parallel lines, respectively, is seen a perforation. This combination of devices is marked "Dart-space," with the direction parallel with the base-line "Put this line over line of chest."

The curved (top) line in Fig. 2 is marked "Side seam."

The lower half of the left-hand side of the device in Fig. 2 is marked "Center line of back neck," and is used in connection with the base-line of Fig. 2, and also with the curved neck-line. (Seen in the drawing.)

One straight line and three curved lines, with different centers, are seen in the body of the device in Fig. 2.

The uses of these various scales and indicating-figures, and of the various perforations, lines, &c., described above, are fully explained hereinafter.

The notes of directions to be printed on the device are given here in order that the specification may embody a complete description and full directions for use of the device. I sometimes use letters or other characters in place of figures on the scales.

Operation: The operation of my invention is best described by my "Rules" for taking measures and drafting ladies' dresses.

1. *Slope of shoulder.*—Pass the tape around the back of neck and down front of arm-size, directly back across the back, even with armpit. Put a pin in center of back, top of tape; measure from neck-bone to pin. The measure from bone to pin is the slope. This measure is to be used in the back, and only for front-arm size when it gives the smallest number. When the breast-measure is the smallest, use it to get front-arm size and height of dart. When the slope gives the largest number, drop the outer point of shoulder the difference between slope and breast-measure.

2. *Length of back.*—From neck-bone to bottom of waist.

3. *Width of back.*—From armpit to armpit.

4. *Size of breast.*—Around upper part of same, close up under the arms, across the back as tight as you can draw. Even measures for children. This measure gives front neck, and when smaller than slope of shoulder is used for front-arm size and height of dart.

5. *Width of shoulder.*—Even with bone in back of neck, down on the seam, as long as you wish.

6. *Size of waist.*—As you wish it to be.

7. *Side seam.*—From armpit to hip.

8. *Size of chest.*—Around the largest part, up under the arms; a smooth even measure across the back. Then add one inch.

9. *Size of neck.*—Take one-half of same measure from neck-bone to center of throat.

10. *Height of dart.*—By the pattern-chart, use breast-measure, if the smallest number.

11. *Length of point.*—From neck-bone to waist.

We will now take the measure of a lady and draft a waist: First, slope of shoulder, 7½, gives No. 30; second, length of waist, 16; third, width of back, 14½; fourth, size of breast, 33; fifth, width of shoulder, 6½; sixth, size of waist, 28; seventh, length of side seam, 8¾; eighth, size of chest, 41; ninth, size of neck, 7½; tenth, height of dart, 14½; eleventh, length of point, 20½.

To draft a back, commence at left end of back neck; draw a line on back neck down the length of back; dot for slope of shoulder, 7½ inches. See what number it gives. If 30, dot for length of waist 16. Then so move pattern-chart that line for width of back will come at dot for slope of shoulder. Have edge of pattern-chart on line of back; then dot for width of back 7¼ inches. Find number of breast in back-neck scale at either end of pattern-chart. Lay number of breast on line of back; draw line of shoulder; put waist-scale over dot for length of waist; dot size of waist; draw line from lower point of back-arm size to waist-line.

To draft side body, take the back, cut ⅛ inch from line of back-form for seam; pin back on to cloth or paper; dot at either end of back-form line. Lay pattern-chart on with width of back line at dot for slope of shoulder; dot for width of back; then lay line of waist at length of waist; dot in number of waist, draw side-seam arm-size, and take V off of side body, as it is on the pattern-chart. To baste, stretch the front shoulder, side body, and front side seam.

To draft front, lay pattern-chart on paper or cloth; draw a line on front edge; dot at either end of chest-line; dot in front neck, 33, breast-measure; dot for height of dart 30. Size of neck $7\frac{1}{2}$ inches from front neck to line of back; draw chest-line from dots for same. Get size of chest. Chest measures 41 inches; width of back $14\frac{1}{2}$. Take back out of chest; $14\frac{1}{2}$ from 41 leaves $26\frac{1}{2}$. One-half of that number is $13\frac{1}{4}$. This we take for chest. For front, make a line out on chest-line $13\frac{1}{4}$ inches. Lay the pattern-chart on with the hole over center of the two lines; dot in 30 for front-arm size, which is governed by the slope. If it is less than breast-measure, the slope, $7\frac{1}{2}$ inches, gives No. 30. The breast-measure is 33 inches. To get front shoulder, lay the center of back on the line of back, lower point of neck on front-neck line; hold the corner of back neck in place; put the lower point of back-arm size on chest-line; dot ⅓ of inch from end of shoulder for shoulder of front. Lay pattern-chart on front line at dot for height of darts; draw line for height of darts; length of point from neck-bone to waist-line, $20\frac{1}{2}$ inches; draw line at right angles with front line for bottom of waist; side-seam square by waist-line; draw line from upper point of front-arm size to waist-line inside of side seam at waist-line, from $\frac{1}{2}$ to $1\frac{1}{2}$ inch, according to size of chest and waist. If the waist is small and chest large, take from side seam at waist-line, so as to give less in the darts. To get the bottom and tops of dart, lay shoulder of front of pattern-chart on waist-line, number of waist on side seam, and dot at waist-line on pattern-chart. This gives back point of back dart with button-space on chart. Find number of waist, which will give front point of front dart; dot at center of those points for back dart; take space between darts out of front dart; get center of these darts; carry to line for height of darts for tops of the same; draw lines from point to point with scale O to form darts; get length of side seam with the side seam of the back; draw curved line from outer point of arm-size to waist-line for side seam; draw curved line with scale O over the hip from side seam to back dart at waist-line.

I claim—

1. The pattern-chart provided with the double back-neck scale shown in Fig. 1, when the distances between the corresponding lines of the two parts of the scale are varying, the same in combination with the figures or other indicating-characters corresponding to the breast-measure, all when constructed and arranged to operate substantially as described and shown.

2. The pattern-chart provided with the front-arm-size scale shown in Fig. 2, with its combination of lines, perforations, and figures, or other indicating-characters corresponding to the breast-measure, all when constructed and arranged to operate substantially as described and shown.

3. The pattern-chart provided with the device marked "Dart-space" in Fig. 2, formed by the combination of the obtuse-angled guide-edge, the lines seen, and the perforations, all when constructed and arranged to operate substantially as described and shown.

4. The pattern-chart provided with the device marked "Center-line of back neck" in Fig. 2, in combination with the base-line of the dart-space and the long or front edge of the whole pattern-chart, all when constructed and arranged to operate substantially as described and shown.

5. The pattern-chart provided with the double back-neck scale, the line of back-guide, the waist-scale for back, the curved side-seam scale, the shoulder of back-scale, and the width of back-scale with its perforations, all when constructed and arranged to operate substantially as described and shown.

6. The pattern-chart provided with scale marked "Use breast-measure for front neck," the scale marked "Use breast-measure for height of darts," the line marked "Lay this line on front for top of darts," the scale for top of darts No. 1, the scale for top of back-darts No. 2, the scale marked "Button-space," the curved edge-guide marked "Side seam," the dart-space with its lines and perforations, the edge-guide marked "Center-line of back neck," the chest-scale with its perforations, and the front-arm-size scale with its perforations, all when constructed and arranged to operate substantially as described and shown.

CALEB HENRY GRIFFIN.

Witnesses:
LEMUEL P. JENKS,
JEROME DAVIS.